United States Patent
Sumimoto et al.

(10) Patent No.: US 8,342,020 B2
(45) Date of Patent: Jan. 1, 2013

(54) TIRE TESTING MACHINE AND TIRE TESTING METHOD

(75) Inventors: Yu Sumimoto, Takasago (JP); Koichi Honke, Kobe (JP); Masao Murakami, Takasago (JP); Tetsuya Yoshikawa, Takasago (JP); Toshikatsu Nonaka, Takasago (JP)

(73) Assignee: Kobe Steel, Ltd., Kobe Shi (JP)

( * ) Notice: Subject to any disclaimer, the term of this patent is extended or adjusted under 35 U.S.C. 154(b) by 699 days.

(21) Appl. No.: 12/433,283

(22) Filed: Apr. 30, 2009

(65) Prior Publication Data

US 2009/0308156 A1 Dec. 17, 2009

(30) Foreign Application Priority Data

Jun. 11, 2008 (JP) .................................. 2008-153107

(51) Int. Cl.
*G01M 1/16* (2006.01)
(52) U.S. Cl. .......................................... 73/462; 73/146
(58) Field of Classification Search .................... 73/462, 73/460, 146, 471, 487
See application file for complete search history.

(56) References Cited

U.S. PATENT DOCUMENTS

| | | | | |
|---|---|---|---|---|
| 3,595,068 A * | 7/1971 | Skidmore | ........................ | 73/66 |
| 3,760,633 A * | 9/1973 | Skidmore | ........................ | 73/66 |
| 3,911,751 A * | 10/1975 | Shooter et al. | ................... | 73/464 |
| 4,014,139 A * | 3/1977 | Shooter et al. | ................... | 451/67 |
| 4,366,707 A * | 1/1983 | Jarschel | .......................... | 73/146 |
| 5,257,561 A * | 11/1993 | Folta | .............................. | 82/165 |
| 5,383,361 A * | 1/1995 | Matumoto | ...................... | 73/471 |
| 5,467,647 A * | 11/1995 | Schepp | ........................... | 73/146 |
| 6,131,455 A * | 10/2000 | Matsumoto et al. | ............ | 73/462 |
| 6,308,566 B1 * | 10/2001 | Matsumoto et al. | ............ | 73/462 |
| 6,453,736 B1 * | 9/2002 | Straub | ............................ | 73/146 |
| 6,549,387 B1 * | 4/2003 | Nakamura et al. | ............ | 361/93.1 |
| 6,584,835 B2 * | 7/2003 | Jenniges et al. | ................ | 73/146 |
| 6,658,936 B2 * | 12/2003 | Matsumoto | ..................... | 73/460 |
| 6,714,858 B2 * | 3/2004 | Oblizajek et al. | ............ | 701/124 |

(Continued)

FOREIGN PATENT DOCUMENTS

JP   2-502361   8/1990

(Continued)

OTHER PUBLICATIONS

U.S. Appl. No. 12/919,027, filed Aug. 24, 2010, Yoshikawa, et al.
Notice of Preliminary Rejection issued Apr. 18, 2011, in Korean Patent Application No. 10-2009-51547 (with English translation).

*Primary Examiner* — Hezron E Williams
*Assistant Examiner* — Samir M Shah
(74) *Attorney, Agent, or Firm* — Oblon, Spivak, McClelland, Maier & Neustadt, L.L.P.

(57) ABSTRACT

A tire testing machine according to the present invention, which can measure both uniformity and dynamic balance of a tire T, comprises a spindle for driving the tire T to rotate about a vertical axis, a spindle housing which supports the spindle rotatably, and a rotating drum rotatable about an axis parallel to an axis of the spindle and movable toward and away from the tire T. The spindle housing is fixed to a base through a piezoelectric sensor so that it can bear a pressing force provided from the rotating drum. The piezoelectric sensor is disposed within a plane including the axis of the spindle and perpendicular to the pressing force. With this structure, dynamic balance of the tire can be measured accurately and easily.

8 Claims, 5 Drawing Sheets

U.S. PATENT DOCUMENTS

| | | | |
|---|---|---|---|
| 6,772,626 B1 * | 8/2004 | Engel et al. | 73/146 |
| 6,779,391 B2 * | 8/2004 | Bosl | 73/146 |
| 6,892,612 B2 * | 5/2005 | Poling et al. | 82/101 |
| 6,988,397 B1 * | 1/2006 | Delmoro et al. | 73/146 |
| 7,040,154 B2 * | 5/2006 | Shaw et al. | 73/146.5 |
| 7,318,346 B2 * | 1/2008 | Haimer | 73/462 |
| 7,368,024 B2 * | 5/2008 | Majumdar et al. | 156/110.1 |
| 7,946,164 B2 * | 5/2011 | Schraudolf et al. | 73/146 |
| 2002/0124650 A1 * | 9/2002 | Matsumoto | 73/460 |

FOREIGN PATENT DOCUMENTS

| | | |
|---|---|---|
| JP | 2002-267561 | 9/2002 |
| JP | 2005-69886 | 3/2005 |
| KR | 1996-0004136 | 4/1989 |
| KR | 2002-0072211 | 9/2002 |

\* cited by examiner

TIRE TESTING MACHINE AND TIRE TESTING METHOD

BACKGROUND OF THE INVENTION

1. Field of the Invention

The present invention relates to a tire testing machine which as a single machine permits measurement of both uniformity and dynamic balance of a tire, as well as a tire testing method which permits measurement of both uniformity and dynamic balance of a tire in the tire testing machine as a single machine.

2. Description of the Related Art

Heretofore, as a tire testing machine capable of measuring both uniformity and dynamic balance of a tire, there has been known such a tire testing machine as shown in U.S. Pat. No. 6,131,455. The tire testing machine disclosed in the patent is provided with a spindle to hold a tire and a spindle housing which supports the spindle rotatably. At the side of the spindle housing is disposed a rotating drum having a rotational axis parallel to that of the spindle. In the rotating drum are provided load cells capable of detecting a load of double-axial component. In the spindle housing are provided fixing members for fixing (rigidly supporting) the spindle housing to a base against the load imposed from the rotating drum.

When measuring uniformity of a tire, it is necessary to bear the force applied from the rotating drum to the tire. For this reason the spindle housing is fixed to the base with the fixing members. The rotating drum is brought into contact with the tire and uniformity of the tire is measured from the load detected by the load cells.

On the other hand, when measuring dynamic balance of the tire, the fixing members are released to bring the spindle housing into a vibratable state and the spindle is rotated at a higher rotation speed than in the uniformity measurement. If a tire involving some trouble in dynamic balance is rotated at a high rotation speed, the tire rotates eccentrically and the spindle housing also rotates while deflecting with respect to the base. A load cell is disposed between the spindle housing and the base to measure a deflection of the spindle housing caused by the eccentric rotation of the tire, whereby dynamic balance is measured.

In the tire testing machine of the foregoing U.S. patent, the spindle fixing method in the dynamic balance test and that in the uniformity test are entirely different from each other, thus requiring the use of the aforesaid fixing members. Since it is necessary to fix the spindle housing which is heavy to the base, the fixing members are apt to become large in size and make the structure of the machine complicated. Besides, the testing time becomes long because it is necessary to perform the fixing operation with use of the fixing members. Moreover, since the fixing members engaging and disengaging operations are performed at every measurement, a difficulty has so far been encountered in point of reproducibility of the measurement.

Figure 2:
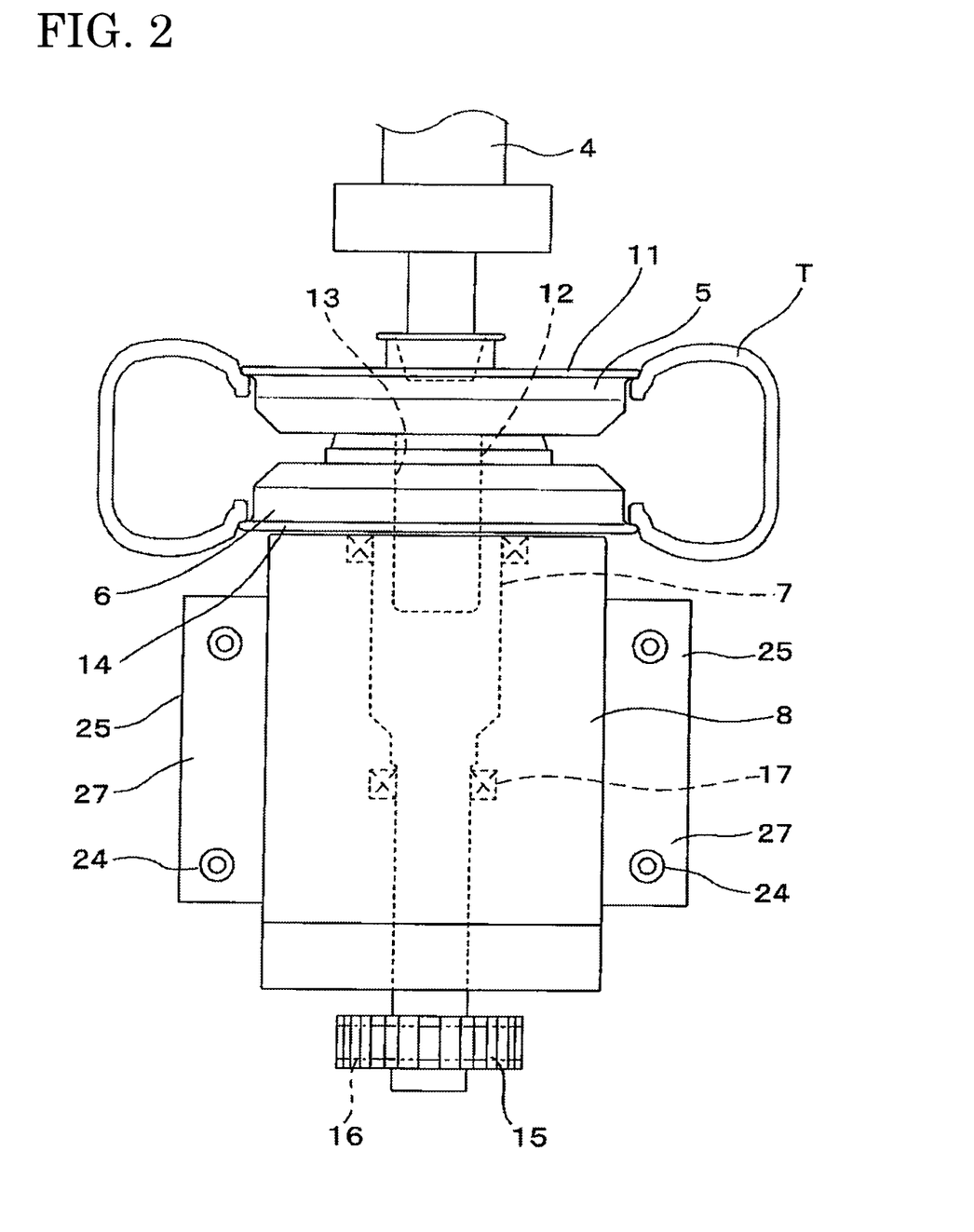
FIG. 2 is a sectional view taken on line A-A in FIG. 1.

In view of this point, there also has been known, for example, such a tire testing machine as is disclosed in U.S. Pat. No. 6,658,936. In this tire testing machine, as is shown in FIG. 2 of the U.S. patent, a fixing member is provided on an outer periphery surface of a spindle housing on the side opposite to a rotating drum, and with this fixing member, the spindle housing is rigidly supported by a base through triaxial piezoelectric force sensors.

In the tire testing machine of the U.S. Pat. No. 6,658,936, the triaxial piezoelectric force sensors are installed in the direction of a pressing force provided from the rotating drum at a distance corresponding to the outside radius of the spindle housing from the axis of a spindle. Therefore, if the load of a dynamic balance test or of a uniformity test is measured by the triaxial piezoelectric force sensors, a moment attributable to the distance is added as an error component to the measured load, thus contributing especially to a decrease of the balance evaluation accuracy.

In the tire testing machine of the U.S. Pat. No. 6,658,936 in question, since four triaxial piezoelectric force sensors are installed, it is difficult to effect positioning of a sensing direction.

SUMMARY OF THE INVENTION

The present invention has been accomplished in view of the above-mentioned problems and it is an object of the invention to provide a tire testing machine and a tire testing method both capable of measuring particularly dynamic balance of a tire in a simple manner and with a high accuracy on the basis of a load measured by a piezoelectric sensor.

The present invention adopts the following technical means in order to achieve the above-mentioned object.

According to the present invention there is provided a tire testing machine comprising a spindle adapted to rotate about a vertical axis together with a tire; a rotational drive unit for rotating the spindle; a spindle housing which supports the spindle rotatably; a base; and a piezoelectric sensor for measuring dynamic balance of the tire, wherein the spindle housing is fixed to the base through the piezoelectric sensor, the piezoelectric sensor is disposed within a plane including an axis of the spindle, and the piezoelectric sensor measures a force component perpendicular to the plane including the axis of the spindle.

According to this structure, it is possible to prevent the occurrence of an error component attributable to the distance between the installed position of the piezoelectric sensor and the axis of the spindle during the dynamic balance measurement, and hence possible to improve the accuracy of the dynamic balance measurement.

Preferably, a positioning member is provided in the spindle housing, the positioning member projecting diametrically outward from an outer periphery surface of the spindle housing and having a pressing surface which is formed to be flat in a direction perpendicular to a pressing force provided from the rotating drum. Preferably, a housing support member is provided in the base, the housing support member having a mounting surface formed so as to be in parallel with and confront the pressing surface of the positioning member. Preferably, the piezoelectric sensor is held grippingly between the pressing surface and the mounting surface.

Preferably, two such piezoelectric sensors as described above are disposed vertically on each of both sides with the axis of the spindle therebetween.

The tire testing machine of the above structure may further comprise a rotating drum rotatable about an axis parallel to the axis of the spindle; rotating drum moving means for moving the rotating drum toward and away from the tire, the rotating drum moving means being fixed to the base; and a force sensor for measuring uniformity of the tire, wherein the spindle housing may be fixed to the base through the piezoelectric sensor so as to bear a pressing force provided from the rotating drum, and the piezoelectric sensor may be disposed within a plane perpendicular to the direction of the pressing force.

The tire testing machine thus structured can effect both dynamic balance measurement and uniformity measurement of a tire efficiently and with a high accuracy.

Preferably, strain gauge type force sensors for measuring force components to be used for the foregoing uniformity measurement are disposed on a shaft portion of the rotating drum on each of both sides with the rotating drum therebetween.

According to the present invention there also is provided a tire testing method for measuring both uniformity and dynamic balance of a tire in a tire testing machine comprising a spindle for driving the tire to rotate about a vertical axis, a spindle housing which supports the spindle rotatably, and a rotating drum rotatable about an axis parallel to the axis of the spindle and movable toward and away from the tire, the tire testing method comprising the steps of driving the tire to rotate about the axis of the spindle; measuring uniformity of the tire while pressing the rotating drum against the tire; and measuring dynamic balance of the tire in a separated state of the rotating drum from the tire, wherein in the dynamic balance measuring step, at least a force component for measuring the dynamic balance is measured by a piezoelectric sensor, the piezoelectric sensor being positioned within a plane including the axis of the spindle and perpendicular to the direction in which the rotating drum is pressed against the tire.

Preferably, in the uniformity measuring step in the above tire testing method, a force component for measuring uniformity is measured by strain gauge type force sensors disposed on a shaft portion of the rotating drum on both sides with the rotating drum therebetween.

The present inventors thought that if an error component attributable to the distance between the installed position of the piezoelectric sensor and the spindle axis is exerted on a centrifugal force of the tire, the occurrence of the error component can be prevented by changing the installed position of the piezoelectric sensor. Further, the present inventors became aware that if the piezoelectric sensor especially for measuring the force component to be used for dynamic balance measurement is disposed within a plane including the axis of the spindle, and perpendicular to the pressing force provided from the rotating drum, and is separately disposed from the piezoelectric sensor for measuring the force component to be used for uniformity measurement, positioning of each piezoelectric sensor can be done easily and it is possible to enhance the evaluation accuracy of the tire test. On the basis of this knowledge, we accomplished the present invention.

According to the tire testing machine and method of the present invention, it is possible to measure dynamic balance of a tire with a high accuracy.

DETAILED DESCRIPTION OF A PREFERRED EMBODIMENT

A tire testing machine 1 according to an embodiment of the present invention will be described below with reference to the drawings.

Figure 1:
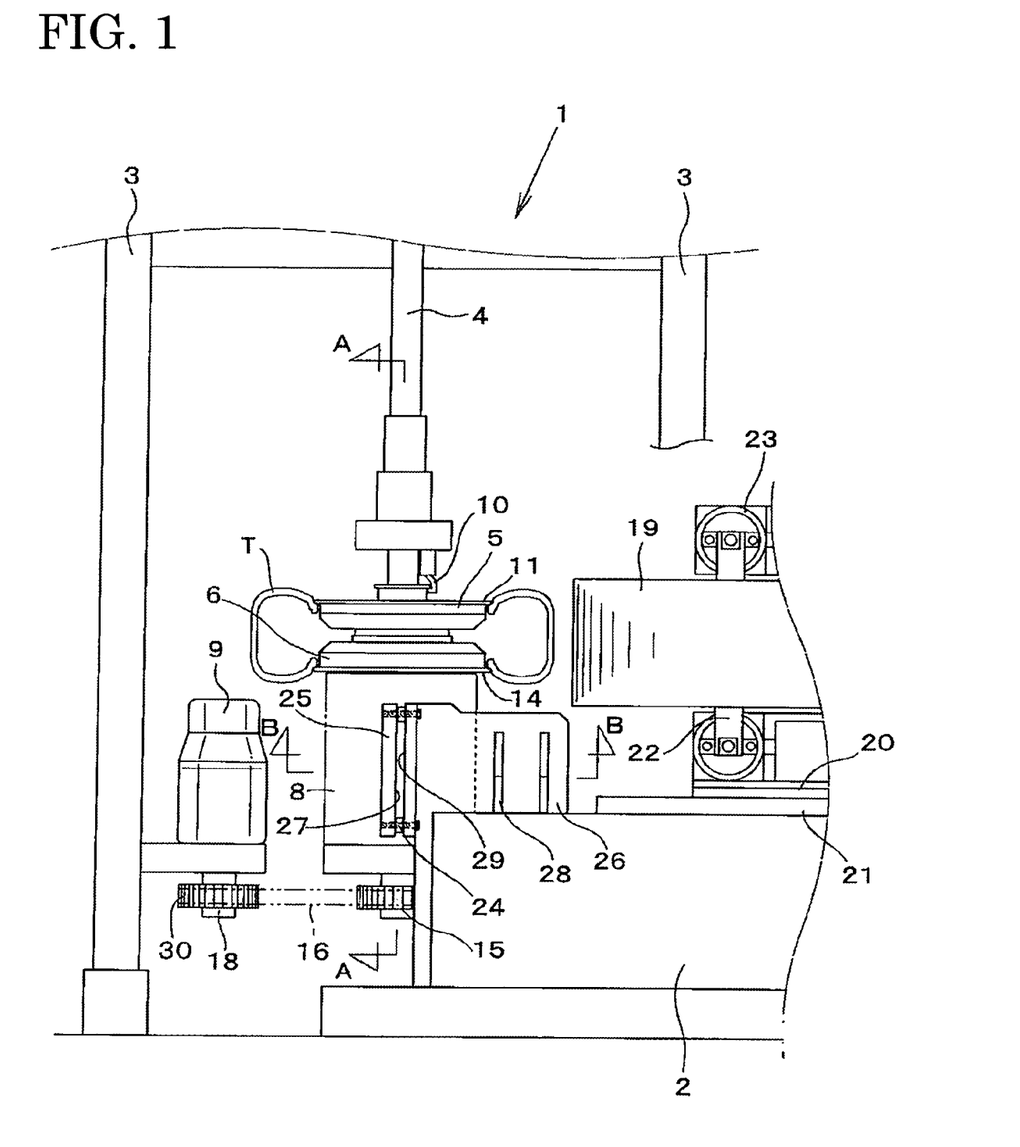
FIG. 1 is a front view of a tire testing machine according to an embodiment of the present invention.

As shown schematically in FIG. 1, the tire testing machine 1 of this embodiment is a composite testing machine for measuring both uniformity and dynamic balance of a tire T. The tire testing machine 1 includes a main frame 3 erected like a turret on a floor surface. The main frame 3 includes an upper shaft 4 capable of being extended and retracted vertically by a lift mechanism (not shown) and an upper rim 5 provided removably on a lower end of the upper shaft 4. Under the upper rim 5 is disposed a lower rim 6 which holds the tire T in cooperation with the upper rim 5. The lower rim 6 is fixed to a spindle 7 and is adapted to rotate together with the spindle which rotates about a vertical axis. The spindle 7 is supported rotatably by a spindle housing 8 fixed to the main frame 3 and is relatively rotatable with respect to the spindle housing 8 by operation of a motor 9. At the side of the spindle 7 is disposed a rotating drum 19 able to be contacted with the tire T held by the spindle 7, and thereby rotated.

Figure 3:
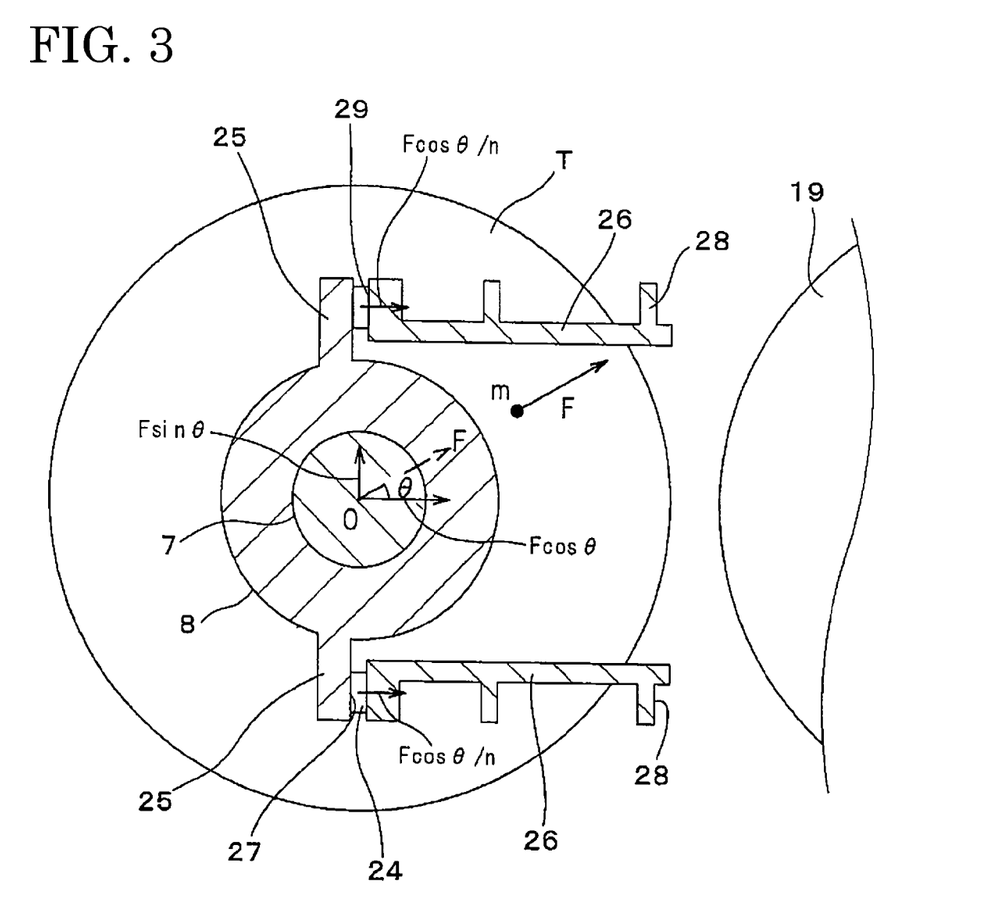
FIG. 3 is a sectional view taken on line B-B in FIG. 1.

Upper and lower sides of the FIG. 1 are assumed to be upper and lower sides respectively in explanation of the tire testing machine 1. Likewise, right and left sides of the FIG. 1 are assumed to be right and left sides respectively in explanation of the tire testing machine 1. Further, upper and lower sides of the FIG. 3 are assumed to be rear and front sides respectively in explanation of the tire testing machine 1. These directions coincide with directions indicated when an operator sees the tire testing machine 1 as in FIG. 1.

As shown in FIGS. 1 and 2, the upper shaft 4 extends in the vertical direction and a lower end side thereof is formed in the shape of a downward-tapered cone, the lower end side can be fitted in a recess formed in an upper surface of the upper rim 5. A locking member 10 for locking the upper rim 5 is provided on the lower end side of the upper shaft 4. By engaging the upper shaft 4 and the upper rim 5 with each other through the locking member 10, the upper rim 5 can move vertically (go up and down) in conformity with the upper shaft 4.

A vertically intermediate portion of the upper rim 5 is formed in the shape of a disc having an outside diameter matching the inside diameter size of the tire T. This intermediate portion is fitted inside the tire T from above. An outer periphery edge of upper end of the upper rim 5 is provided with an upper flange portion 11 formed in the shape of a projecting flange. With the flange portion 11, the tire T can be pressed down from above.

A vertically-downward projecting columnar engaging portion 12 is formed on a lower end side of the upper rim 5. By fitting the engaging portion 12 into a to-be-engaged portion 13 of the lower rim 6, the engaging portion 12 becomes engaged with the lower rim 6 and can rotate together with the lower rim 6.

The lower rim 6 is formed in a vertically inverted shape of the upper rim 5 and the lower rim 6 is mounted on the spindle 7. Like the upper rim 5, a vertically intermediate portion of the lower rim 6 is formed in the shape of a disc matching the inside diameter size of the tire T so that it can be fitted inside the tire T from below. An outer periphery edge of lower end of the lower rim 6 is provided with a lower flange portion 14 formed in the shape of a projecting flange. The tire T is supported from below by the lower flange portion 14.

The spindle 7 is formed in a cylindrical shape around a vertical axis. An upper portion of the spindle 7 has the to-be-engaged portion 13 which is engageable with the engaging portion 12 of the upper rim 5. The to-be-engaged portion 13 is formed in the shape of a vertical hole along the axis of the spindle 7, permitting the engaging portion 12 of the upper rim 5 to be fitted therein. The lower rim 6 is fixed to an upper portion of the spindle 7 so that both spindle 7 and lower rim 6 can rotate integrally with each other. A lower end side of the spindle 7 is provided with a timing pulley 15, and a timing belt 16 is wound around the timing pulley 15.

The spindle 7 has bearings 17 on its outer periphery side. The bearings 17 are disposed on upper and lower end sides of the spindle 7 at intervals to bear the spindle 7 in a relatively rotatable manner with respect to the spindle housing 8.

The spindle housing 8 is formed in a cylindrical shape around the axis of the spindle 7. Inside the cylinder is accommodated the spindle 7 rotatably. The spindle housing 8 is fixed to (rigidly supported by) the base 2 through a housing support member 26.

A motor 9 is mounted to the main frame 3 at the left side of the spindle housing 8. The motor 9 is provided with a drive shaft 18 extending downward, and a motor pulley 30 is mounted on the drive shaft 18. The timing belt 16 is wound around the motor pulley 30 and the power of the motor 9 can be transmitted to the spindle 7 through the timing belt 16.

An outline of the rotating drum 19 is formed in a cylindrical shape and a road surface for contacted with the tire T is formed on an outer periphery surface of the rotating drum 19. The rotating drum 19 is rotatable around a vertical axis, and the axis of the rotating drum 19 is spaced rightward from the axis of the spindle 7.

Under the rotating drum 19 are disposed a pair of linear guides 20 and 21 to support the rotating drum 19. The rotating drum 19 is fixed to the upper linear guide 20, while the lower linear guide 21 is fixed to the base 2. The upper linear guide 20 is slidable in the right and left direction with respect to the lower linear guide 21. Therefore, the rotating drum 19 placed on the upper linear guide 20 is guided toward and away from the tire T.

The rotating drum 19 is supported rotatably on a shaft 22 which is extended upward and downward from the rotating drum 19. The shaft 22 is supported by the upper linear guide 20. Double-axial strain gauge type force sensors 23 for measuring forces transmitted through the rotating drum 19 from the tire T are mounted on the shaft 22.

A description will be given below about a uniformity test for the tire T using the tire testing machine 1 described above.

When the tire T is placed on the lower rim 6, and the upper rim 5 is moved toward the lower rim 6 by extending the upper shaft 4, the tire T is held grippingly between the upper and lower flange portions 11, 14. The locking member 10 is disengaged to raise the upper shaft 4, then the rotating drum 19 is moved toward the tire T to be pushed against the tire T. Thereafter, the motor 9 is rotated, and the power of the motor 9 is transmitted to the spindle 7 through the motor pulley 30, the timing belt 16, and the timing pulley 15 to rotate the spindle 7.

Double-axial strain gauge type force sensors 23 adapted to sense double-axial forces in the plate thickness direction and in a direction perpendicular thereto are disposed at both upper and lower positions of the shaft 22 of the rotating drum 19, whereby forces in the vertical direction and in the approaching or separating direction (right or left direction) created in the rotating drum 19 rotated by the tire T are measured. Uniformity of the tire T is evaluated on the basis of the forces in the vertical direction and in the approaching or separating direction thus measured by the double-axial strain gauge type force sensors 23.

The tire testing machine 1 according to the present invention is fixed to the base 2 through piezoelectric sensors 24 so that the spindle housing 8 can bear the pressing force applied thereto from the rotating drum 19. The piezoelectric sensors 24 are held grippingly between positioning members 25 provided in the spindle housing 8 and housing support members 26 of the base 2. The piezoelectric sensors 24 are used to measure the force in the pressing direction of the rotating drum 19 and thereby measure dynamic balance of the tire T. In the tire testing machine 1, particularly in order that the dynamic balance can be measured with a high accuracy, the piezoelectric sensors 24 are disposed within a plane including the axis of the spindle 7 and perpendicular to the pressing force.

As shown in FIG. 2, the positioning members 25 are each formed like a plate projecting diametrically outward from an outer periphery surface of the spindle housing 8. The positioning members 25 are disposed on front and rear sides respectively of the spindle housing 8. Each positioning member 25 is provided with a pressing surface 27 which is flat in both vertical and front-rear directions. The pressing surface 27 is formed in a direction perpendicular to the pressing direction of the rotating drum 19 against the tire T. By installing the piezoelectric sensors 24 on the pressing surface 27, the piezoelectric sensors 24 can be positioned within a plane including the axis of the spindle 7 and perpendicular to the pressing direction of the rotating drum 19.

The housing support members 26 are each formed in the shape of a plate projecting upward from the base 2 and extending in the right and left direction. Correspondingly to the positioning members 25, the housing support members 26 are disposed on front and rear sides respectively of the spindle housing 8. The housing support members 26 are provided with reinforcing ribs 28 respectively, whereby the housing support members 26 are fixed strongly to the base 2. The left end of each of the housing support members 26 is bent perpendicularly in a direction away from the spindle housing 8 and a mounting surface 29 is formed in this bent portion.

The mounting surface 29 is formed flat in both vertical and front-rear directions and faces in a direction perpendicular to the pressing force provided from the rotating drum 19. The mounting surface 29 is positioned in parallel with the pressing surface 27 of the associated positioning member 25. Piezoelectric sensors 24 are held grippingly between the mounting surface 29 of each of the housing support members 26 and the pressing surface 27 of the associated positioning member 25.

The piezoelectric sensors used in the present invention are generally called piezoelectric force sensors and have high rigidity. In this embodiment, as the piezoelectric sensors, there are used piezoelectric sensors 24 each provided in the interior thereof with a measuring element sensitive to a compressive force in the plate thickness direction and capable of measuring a load applied in the plate thickness direction. The piezoelectric sensors 24 are each mounted so that its plate surface is parallel to the pressing surface 27 of the associated positioning member 25 (the mounting surface 29 of the associated housing support member 26), thereby permitting measurement of only a force component parallel to the pressing direction of the rotating drum 19 against the tire T.

The piezoelectric sensors 24 are each disposed between the pressing surface 27 of the associated positioning member 25 and the mounting surface 29 of the associated housing support member 26, and support the spindle housing 8 rigidly against the base 2. Thus, the piezoelectric sensors 24 serve not only as load measuring sensors but also as support members for mounting the spindle housing 8 to the base 2.

The piezoelectric sensors 24 are provided in such a manner that upper and lower piezoelectric sensors 24 as one set are provided for each of the front and the rear positioning members 25 (housing support members 26) as one set. That is, a plurality of the piezoelectric sensors 24 are disposed in the vertical direction on each of both sides with the axis of the spindle 7 therebetween. In this embodiment, there are used a total of four piezoelectric sensors 24, two on each side, vertically.

The following description is now provided about a dynamic balance test of the tire T using the tire testing machine 1 described above. Consideration will be given to the case where the dynamic balance test is performed after the end of the uniformity test.

First, when the uniformity test is over, the upper linear guide 20 is slid relative to the lower linear guide 21, causing the rotating drum 19 to leave the tire T.

After the rotating drum 19 leaves the tire T, the rotation speed of the motor 9 is increased until the rotation speed of the tire reaches a level for dynamic balance. The rotation speed of tire T for the dynamic balance is assumed to be much higher than in the uniformity test (60 rpm according to JASO C607), and in this embodiment it is 800 rpm.

As shown in FIG. 3, an eccentric quantity, m, of a high composition density lies in part of the tire T. If such a tire T is rotated at a rotation speed as high as 800 rpm about the axis O of the spindle 7, unexpected centrifugal force F is developed in the eccentric quantity, m. The centrifugal force F acts on the axis of the spindle housing 8 (the axis O of the spindle 7).

In this connection, consideration is here given to a case where the eccentric quantity, m, lies at a position of an angle $\theta$ relative to the right and left direction from the axis of the spindle 7. The centrifugal force F can be divided into a force component $F \cos \theta$ along the pressing force provided from the rotating drum 19, and a force component $F \sin \theta$ perpendicular thereto. The force component $F \cos \theta$ along the pressing force provided from the rotating drum 19 is measured by n number of piezoelectric sensors 24 disposed within a plane including the axis of the spindle 7 and perpendicular to the pressing force provided from the rotating drum 19. That is, the force, f, measured by one piezoelectric sensor 24 is given by the following equation (1), assuming that the number of installed piezoelectric sensors 24 is n:

$$f = F \cos \theta / n \tag{1}$$

When the angle $\theta$ is 0° or 180°, the force measured by a piezoelectric sensor 24 takes a maximum value fmax or a minimum value fmin, and the values are given by the following equations (2):

$$f\text{max} = F/n, f\text{min} = -F/n \tag{2}$$

That is, by measuring the force component $F \cos \theta$ along the pressing force provided from the rotating drum 19 with time and with use of the piezoelectric sensors 24, it is possible to determine the maximum value fmax or the minimum value fmin of the force component measured by each piezoelectric sensor 24. On the other hand, since the number of the piezoelectric sensors 24 installed is given, the centrifugal force F can be determined from the maximum value fmax or the minimum value fmin in accordance with the equation (2) and dynamic balance of the tire T is evaluated by evaluating the centrifugal force F.

A comparative embodiment will be given below to understand the present invention more clearly.

Figure 4:
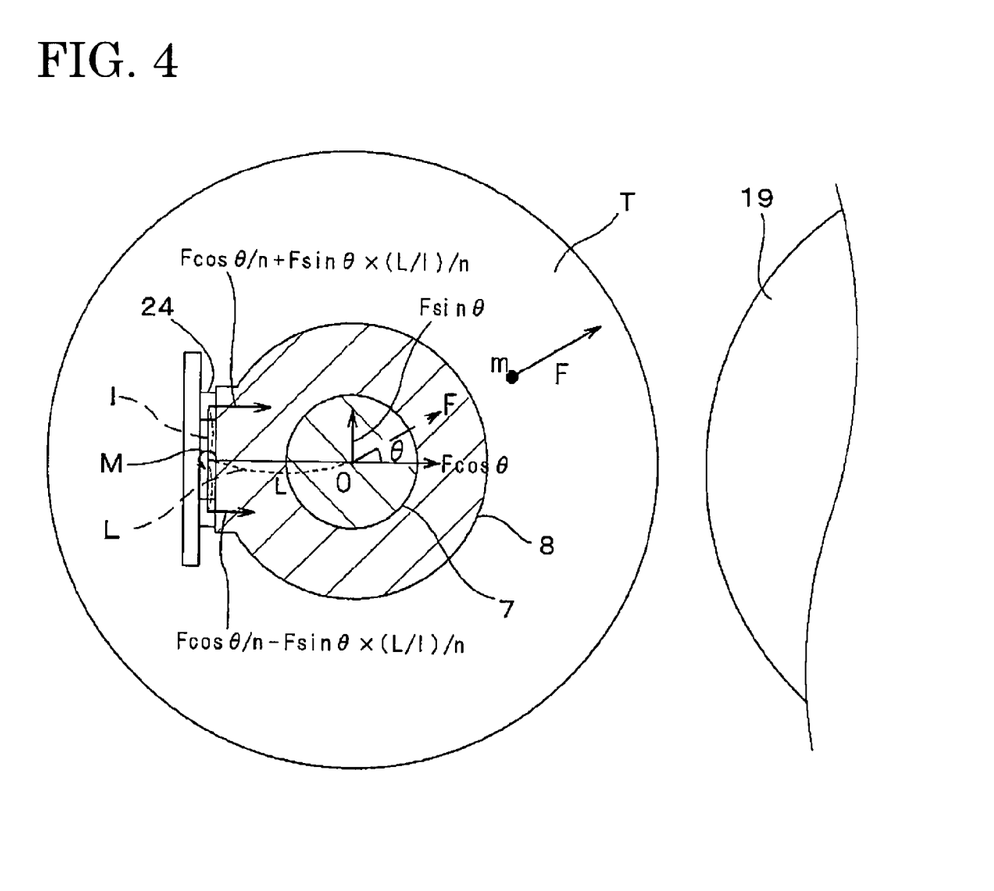
FIG. 4 is a sectional view of a comparative embodiment of a tire testing machine as seen from the same position as in FIG. 3.

In the comparative embodiment, as shown in FIG. 4, piezoelectric sensors 24 are disposed on the outer periphery surface of the spindle housing 8 on the side opposite to the rotating drum 19 with respect to the axis of the spindle 7. The piezoelectric sensors 24 are disposed at a position spaced a distance L in the right and left direction and a distance 1 in the front-rear direction from the axis of the spindle 7. As the piezoelectric sensors in the comparative embodiment, same number of the piezoelectric sensors 24 is used as in the above embodiment. A total of n number of these piezoelectric sensors 24 are disposed in vertical and front-rear directions along the outer periphery surface of the spindle housing 8 on the side opposite to the rotating drum 19.

Now, forces measured by the piezoelectric sensors 24 in the comparative embodiment will be considered below.

Also in the comparative embodiment, if the eccentric quantity, m, lies at the angle $\theta$ position relative to the right and left direction from the axis of the spindle 7, the centrifugal force F can be divided into the force component $F \cos \theta$ along the pressing force provided from the rotating drum 19 and the force component $F \sin \theta$ perpendicular thereto.

The force component $F \cos \theta$ along the pressing force provided from the rotating drum 19 is measured by four piezoelectric sensors 24. In the case of the comparative embodiment, however, the force applied to the piezoelectric sensors 24 is not limited to the force component along the pressing direction, but includes as an error component fm which is a force derived from a moment which is attributable to the force component perpendicular to the pressing direction.

The moment M which causes the error component fm is given by the following equation (3) using a distance L along a pressing direction from the axis O to the installed position of each piezoelectric sensor 24:

$$M = F \sin \theta \times L \tag{3}$$

That is, the error component fm derived from the moment M is given by the following equation (4) using a distance 1 perpendicular to the pressing direction (a distance 1 between an operating force point and an operating point of the moment M) from the axis O to each piezoelectric sensor 24:

$$fm = F \sin \theta \times (L/l)/n \tag{4}$$

Therefore, a force f' detected by each piezoelectric sensor, including the error component fm, is given by the following equation (5):

$$f' = F \cos \theta / n \pm F \sin \theta \times (L/l)/n \tag{5}$$

That is, in the comparative embodiment, the error component fm not existent in the above embodiment is included in the force f' measured by the piezoelectric sensor 24, thus making it impossible to measure the centrifugal force F with a high accuracy.

Next, a comparative description will be given below between the above embodiment and the comparative embodiment with use of ideal waveforms (FIG. 5) obtained in the measurement of forces by piezoelectric sensors 24.

Figure 5:
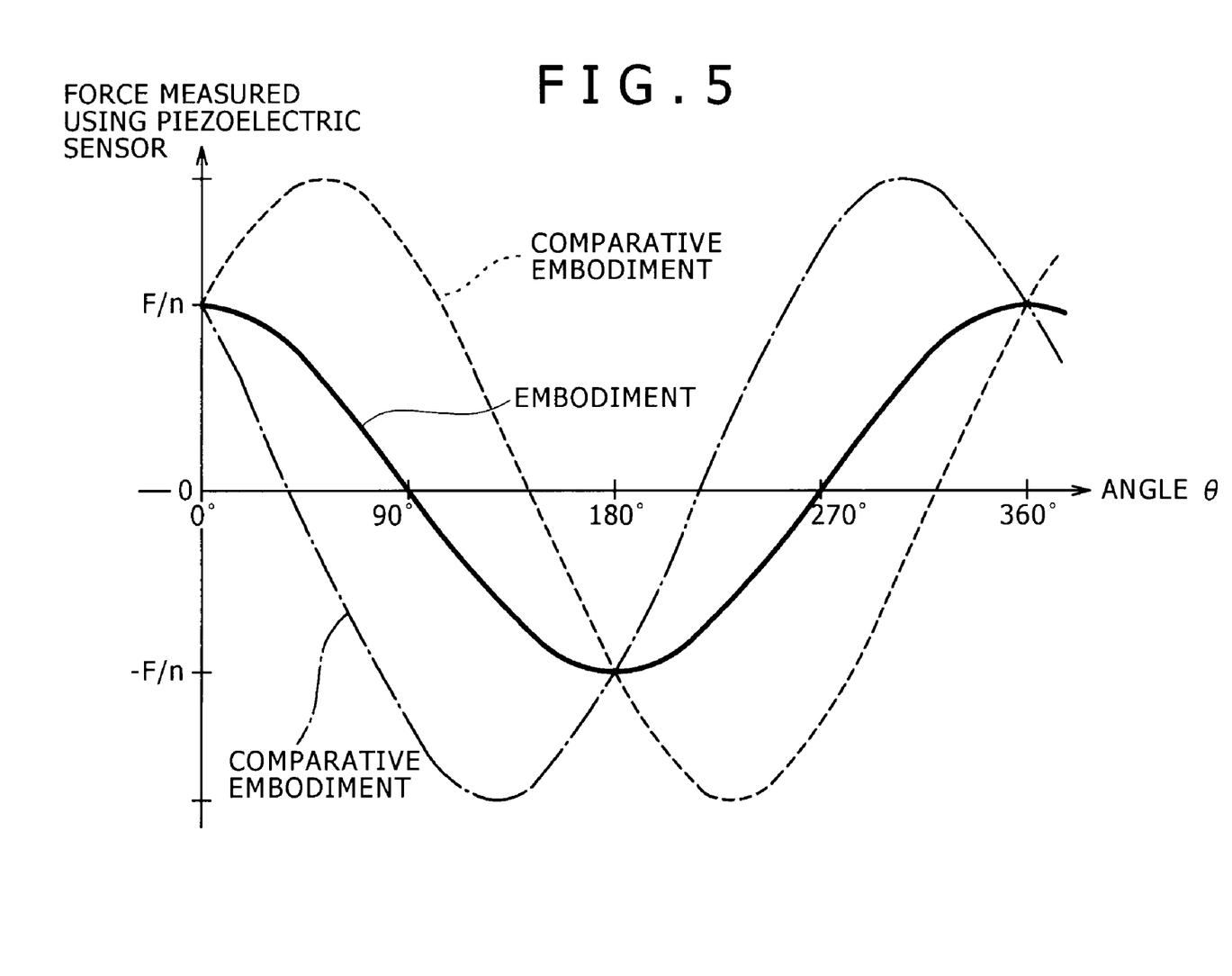
FIG. 5 is a diagram showing changes in centrifugal force as measured using piezoelectric sensors of the embodiment and the comparative embodiment.

As shown in FIG. 5, changes in forces f and f' measured by the piezoelectric sensors 24 in the above embodiment and the comparative embodiment are measured as sine waves. As to a change of the force f measured by each piezoelectric sensor 24 in the above embodiment, (a solid line in FIG. 5), the absolute value of the maximum value fmax and the minimum value fmin is F/n, and therefore the centrifugal force F can be determined easily if the number of piezoelectric sensors installed is given.

On the other hand, as to a change of the force f' measured by each piezoelectric sensor 24 in the comparative embodiment (a dotted line and a dot-dash line in FIG. 5), the maximum and minimum values of the force f' do not become F/n, but appear as output values which is larger than that in the above embodiment. This is presumed to be because an error component fm is added to the force f' measured by each piezoelectric sensor 24 in the comparative embodiment by an amount corresponding to the force based on the moment M. The output value of the piezoelectric sensor has a characteristic such that the larger the absolute value, the larger the error. In the comparative embodiment, therefore, a larger error is included with an increase of the output value, and due to a phase shift of peaks of output waveforms in the piezoelectric sensors disposed in front and in the rear of the spindle, the error differs markedly at the same phase. Even if there is made a correction by calculation to add output values together, there remains a large error. Thus, in the comparative embodiment, it is impossible to obtain the centrifugal force F with a high accuracy.

On the other hand, in the above embodiment, the maximum value fmax or the minimum value fmin of the output value of the force f measured by the piezoelectric sensor 24 is smaller than in the comparative embodiment and so is the error, thus making it possible to obtain the centrifugal force F with a higher accuracy.

The present invention is not limited to the above embodiment, but changes may be made suitably within the scope not altering the essence of the present invention with respect to the shape, structure, material and combination of the constituent members.

In the above embodiment, the piezoelectric sensors 24 are disposed at four positions, that is, upper and lower positions on both sides with the axis of the spindle 7 therebetween. However, the number of piezoelectric sensors 24 to be installed is not limited to four.

Although in the above embodiment, the spindle housing 8 is formed in a cylindrical shape, it may be formed in a prismatic shape.

Although the piezoelectric sensors 24 used in the above embodiment are those each having a measuring element for measuring only the force component in the pressing direction of the rotating drum 19, there may be used piezoelectric sensors each capable of measuring force components in plural directions if they can measure at least a force component in the pressing direction of the rotating drum 19 and thereby measure dynamic balance. In case of measuring force components in plural directions by the piezoelectric sensors 24, a force component for measuring uniformity can be measured by the piezoelectric sensors 24 instead of using the double-axial strain gauge type force sensors 23 provided on the rotating drum shaft 22. However, it is preferable to divide functions such that the force for measuring dynamic balance is measured by each piezoelectric sensor 24, while the force for measuring uniformity is measured by each double-axial strain gauge type force sensor 23. This is advantageous in that both dynamic balance and uniformity can be measured with a high accuracy and that the cost is low. In this case, it is most preferable to use piezoelectric sensors 24 which measure only the force component in the pressing direction of the rotating drum, because the cost of the piezoelectric sensors becomes still lower.

What is claimed is:

1. A tire testing machine, comprising:
   a spindle adapted to rotate about a vertical axis together with a tire;
   a rotational drive unit for rotating said spindle;
   a spindle housing which supports said spindle rotatably;
   a base; and
   a piezoelectric sensor for measuring dynamic balance of said tire,
   wherein said spindle housing is fixed to said base through said piezoelectric sensor,
   said piezoelectric sensor is disposed within a plane including an axis of said spindle, said plane being oriented such that said piezoelectric sensor measures a force component perpendicular to said plane.

2. The tire testing machine according to claim 1, wherein:
   a positioning member is provided in said spindle housing, said positioning member projecting diametrically outward from an outer periphery surface of said spindle housing and having a pressing surface formed within said plane including the axis of said spindle,
   a housing support member is provided in said base, said housing support member having a mounting surface formed so as to be in parallel with and confront said pressing surface of said positioning member, and
   said piezoelectric sensor is held grippingly between said pressing surface and said mounting surface.

3. The tire testing machine according to claim 1, wherein two said piezoelectric sensors are disposed vertically on each of both sides with the axis of said spindle therebetween.

4. The tire testing machine according to claim 1, further comprising:
   a rotating drum rotatable about an axis parallel to the axis of said spindle;
   rotating drum moving means for moving said rotating drum toward and away from said tire, said rotating drum moving means being fixed to said base; and
   a force sensor for measuring uniformity of said tire,
   wherein said spindle housing is fixed to said base through said piezoelectric sensor so as to bear a pressing force provided from said rotating drum, and
   said piezoelectric sensor is disposed within a plane perpendicular to the direction of said pressing force.

5. The tire testing machine according to claim 4, wherein said force sensor for measuring uniformity is a strain gauge type force sensor, said strain gauge type force sensor being disposed on a shaft portion of said rotating drum on each of both sides with said rotating drum therebetween.

6. The tire testing machine according to claim 1, wherein said piezoelectric sensor measures only the force component perpendicular to said plane including the axis of said spindle.

7. A tire testing method for measuring both uniformity and dynamic balance of a tire in a tire testing machine comprising a spindle for driving said tire to rotate about a vertical axis, a spindle housing which supports said spindle rotatably, and a rotating drum rotatable about an axis parallel to the axis of said spindle and movable toward and away from said tire, said tire testing method comprising the steps of:
   driving said tire to rotate about the axis of said spindle;
   measuring uniformity of said tire while pressing said rotating drum against said tire; and
   measuring dynamic balance of said tire in a separated state of said rotating drum from the tire,
   wherein in said dynamic balance measuring step, at least a force component for measuring the dynamic balance is measured by a piezoelectric sensor, said piezoelectric sensor being positioned within a plane including the axis of said spindle and perpendicular to the direction in which said rotating drum is pressed against said tire.

8. The tire testing method according to claim 7, wherein in said uniformity measuring step, a force component for measuring uniformity is measured by strain gauge type force sensors disposed on a shaft portion of said rotating drum on both sides with said rotating drum therebetween.

* * * * *